United States Patent
Putman et al.

(10) Patent No.: US 9,473,934 B2
(45) Date of Patent: Oct. 18, 2016

(54) WIRELESS TELECOMMUNICATIONS NETWORK, AND A METHOD OF AUTHENTICATING A MESSAGE

(75) Inventors: Tony Putman, Chippenham (GB); Graham Brend, Bath (GB)

(73) Assignee: Alcatel Lucent, Boulogne-Billancourt (FR)

( * ) Notice: Subject to any disclaimer, the term of this patent is extended or adjusted under 35 U.S.C. 154(b) by 755 days.

(21) Appl. No.: 13/640,678

(22) PCT Filed: Mar. 8, 2011

(86) PCT No.: PCT/EP2011/001132
§ 371 (c)(1),
(2), (4) Date: Dec. 18, 2012

(87) PCT Pub. No.: WO2011/128014
PCT Pub. Date: Oct. 20, 2011

(65) Prior Publication Data
US 2013/0095792 A1    Apr. 18, 2013

(30) Foreign Application Priority Data
Apr. 13, 2010    (EP) .................................... 10290201

(51) Int. Cl.
*H04W 12/06*    (2009.01)
*H04W 12/10*    (2009.01)
(Continued)

(52) U.S. Cl.
CPC ............ *H04W 12/06* (2013.01); *H04W 12/10* (2013.01); *H04L 61/2015* (2013.01); *H04L 63/123* (2013.01); *H04W 84/045* (2013.01)

(58) Field of Classification Search
CPC . H04W 84/045; H04W 12/06; H04W 12/10; H04L 61/2015; H04L 63/123
USPC ....................................................... 455/411
See application file for complete search history.

(56) References Cited

U.S. PATENT DOCUMENTS 8,311,561 B2 * 11/2012 Wang et al. ............... 455/456.6
2002/0061756 A1 * 5/2002 Bleckert et al. ............. 455/458
(Continued)

FOREIGN PATENT DOCUMENTS

CN    101335984 A    12/2008
CN    101364910 A    2/2009
(Continued)

OTHER PUBLICATIONS

"3rd Generation Partnership Project; Technical Specification Group Service and System Aspects; Security of H(e)NB; (Release)," 3GPP TR 33.820 V8.3.0, pp. 1-99, XP050435337, Dec. 2009.
(Continued)

*Primary Examiner* — Nathan Mitchell
(74) *Attorney, Agent, or Firm* — Fay Sharpe, LLP (57) ABSTRACT

A method is provided of authenticating a message from a femtocell base station in a wireless telecommunications network comprising a security gateway and a femto-gateway. The method comprising the steps of: checking by the security gateway that a source IP address in the message from the femtocell base station accords with that expected from that femtocell base station, and checking by the femto-gateway that the source IP address in the message accords with that expected from that femtocell base station by inspecting a database relating a femtocell base station identifier to source IP address data.

18 Claims, 7 Drawing Sheets

(51) Int. Cl.
*H04L 29/06* (2006.01)
*H04W 84/04* (2009.01)
*H04L 29/12* (2006.01)

(56) References Cited

U.S. PATENT DOCUMENTS

| | | | |
|---|---|---|---|
| 2009/0156213 A1* | 6/2009 | Spinelli et al. | 455/436 |
| 2010/0062791 A1* | 3/2010 | Wang et al. | 455/456.1 |
| 2010/0075692 A1* | 3/2010 | Busschbach et al. | 455/452.2 |
| 2010/0095368 A1 | 4/2010 | Niu et al. | |
| 2010/0130171 A1* | 5/2010 | Palanigounder et al. | 455/411 |
| 2010/0185537 A1* | 7/2010 | Bari | 705/34 |
| 2010/0190496 A1* | 7/2010 | Chinnathambi | 455/435.1 |
| 2011/0069659 A1* | 3/2011 | Kong et al. | 370/328 |
| 2013/0045716 A1 | 2/2013 | Niu et al. | |
| 2015/0033021 A1* | 1/2015 | Tinnakornsrisuphap et al. | 713/171 |

FOREIGN PATENT DOCUMENTS

| | | |
|---|---|---|
| CN | 101677440 A | 3/2010 |
| EP | 2 161 955 A1 | 3/2010 |
| EP | 2 180 640 A1 | 4/2010 |
| EP | 2 360 986 A1 | 8/2011 |
| WO | WO 2008/096921 A1 | 8/2008 |
| WO | WO-2010/036535 | 4/2010 |
| WO | WO 2010/058847 A1 | 5/2010 |

OTHER PUBLICATIONS

International Search Report for PCT/EP2011/001132 dated Sep. 20, 2011.

* cited by examiner

ALTERNATIVE PROPOSAL

WIRELESS TELECOMMUNICATIONS NETWORK, AND A METHOD OF AUTHENTICATING A MESSAGE

FIELD OF THE INVENTION

The present invention relates to telecommunications, in particular to wireless telecommunications.

DESCRIPTION OF THE RELATED ART

Wireless telecommunications systems are well-known. Many such systems are cellular, in that radio coverage is provided by a bundle of radio coverage areas known as cells. A base station that provides radio coverage is located in each cell. Traditional base stations provide coverage in relatively large geographic areas and the corresponding cells are often referred to as macrocells.

It is possible to establish smaller sized cells within a macrocell. Cells that are smaller than macrocells are sometimes referred to as small cells, microcells, picocells, or femtocells, but we use the term femtocells generically for cells that are smaller than macrocells. One way to establish a femtocell is to provide a femtocell base station that operates within a relatively limited range within the coverage area of a macrocell. One example of use of a femtocell base station is to provide wireless communication coverage within a building. Femtocell base stations are sometimes referred to as femtos.

The femtocell base station is of a relatively low transmit power and hence each femtocell is of a small coverage area compared to a macrocell. A typical coverage range is tens of metres. Femtocell base stations have auto-configuring and self-optimising capabilities so as to enable non-optimised deployment, namely plug-and-play deployment by owners, so as to automatically integrate themselves into an existing macrocell network.

Femtocell base stations are intended primarily for users belonging to a particular home or office. Femtocell base stations may be private access ("closed") or public access ("open"). In femtocell base stations that are private access, access is restricted only to registered users, for example family members or particular groups of employees. In femtocell base stations that are public access, other users may also use the femtocell base station, subject to certain restrictions to protect the Quality of Service received by registered users.

One known type of femtocell base station uses a broadband Internet Protocol connection as "backhaul", namely for connecting to the core network. One type of broadband Internet Protocol connection is a Digital Subscriber Line (DSL). The DSL connects a DSL transmitter-receiver ("transceiver") of the femtocell base station to the core network. The DSL allows voice calls and other services provided via the femtocell base station to be supported. The femtocell base station also includes a radio frequency (RF) transceiver connected to an antenna for radio communications.

In order to be integrated with a macrocell network, femtocell base stations need to exchange signalling messages with various network elements within the (second generation/2.5 generation(2.5G)/third generation) macrocell network. This signalling is compliant with the relevant Third Generation Partnership Project (3GPP) Standard, such that femtocells appear as one or more 3GPP compliant nodes. To achieve this, femtocell base stations are grouped into clusters, each cluster being connected via a gateway, known as a femto-gateway, to the macrocell network.

The femto-gateway terminates the signalling between core network elements in the macrocell network and the femtocell cluster, thereby enabling the whole cluster of femtocells to appear as a single virtual radio network controller (RNC), as required by 3GPP standards.

The femto-gateway can support many thousands of femtocells within a cluster. Each femtocell base station connects to and registers with the femto-gateway with little or no involvement by the user. Femtocell base stations are sometimes referred to as femtos. It is a basic principle that each femto, even if compromised, should not interfere with the operation of another femto. Accordingly, the registration message from a femto must be verified as authentic.

Figure 1:
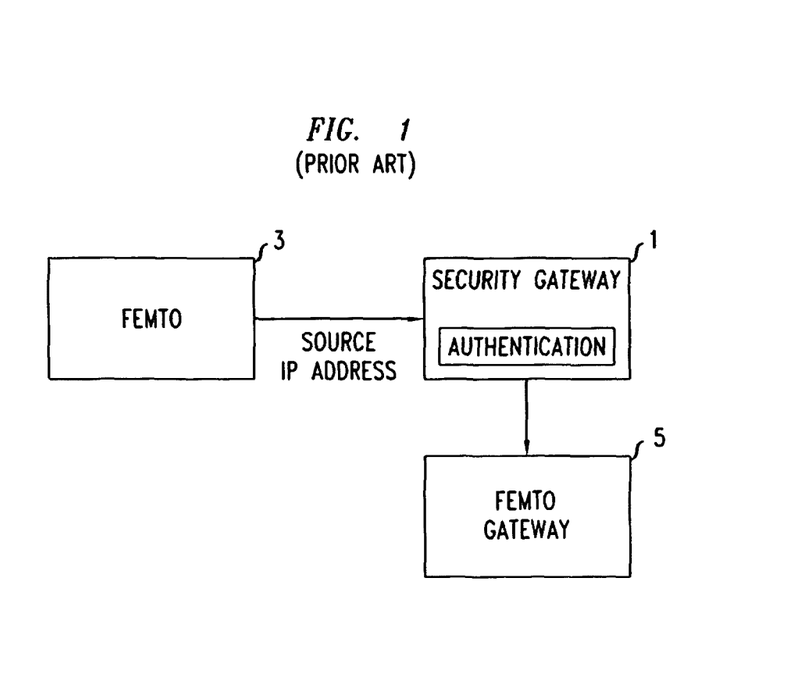
FIG. 1 is a diagram illustrating a known approach to femto authentication/authorisation (PRIOR ART)

As shown in FIG. 1 (PRIOR ART), in one known approach, a security gateway 1 is provided between a femto 3 and a femto-gateway 5. The femto 3 authenticates itself to the security gateway 1 and establishes a secure Internet Protocol tunnel to the security gateway 1. This authentication is sufficient to establish the credentials of the femto.

SUMMARY

The reader is referred to the appended independent claims. Some preferred features are laid out in the dependent claims.

An example of the present invention is a method of authenticating a message from a femtocell base station in a wireless telecommunications network comprising a security gateway and a femto-gateway, the method comprising the steps of:

checking in the security gateway that a source IP address in the message from the femtocell base station accords with that expected from that femtocell base station, and checking in the femto-gateway that the source IP address in the message accords with that expected from that femtocell base station by inspecting a database relating a femtocell base station identifier to source IP address data.

Some preferred embodiments provide a way of confirming that a femtocell base station has been authenticated. A standards-compliant security gateway verifies the source IP address of packets received via an IP security tunnel matches the address or address range which was allocated to the femtocell base station. Additionally, this source IP address is sent as part of a registration message on to the femto-gateway, so the femto-gateway is able to associate the femto identity to this source IP address, and so verify the authenticity of the message.

In preferred embodiments, the source IP address data is a source IP address or source IP address range, which may be a Virtual Private Network, VPN, IP address or VPN IP address range, and is allocated at the time the tunnel is established and is not changed for the duration of the tunnel.

In preferred embodiments, the IP address or IP address range is allocated by the femto-gateway, or another network element which the femto-gateway can query, to retrieve a stored mapping between the femtocell base station identifier and the source IP address or address range. Subsequently, when the femto-gateway receives a registration request message including the source IP address, the femto-gateway uses the stored mapping to determine that the message is authentically from the sending femtocell base station.

The invention may be used in relation to networks having Universal Mobile Telecommunications System (UMTS) femtos and other networks involving femtos that make use of security gateways separate from femto-gateways.

Preferred embodiments advantageously prevent compromised femtos from gaining access to the network, and support the separation of security gateway and femto-gateway functionality.

BRIEF DESCRIPTION OF THE DRAWINGS

Embodiments of the present invention will now be described by way of example and with reference to the drawings, in which.

DETAILED DESCRIPTION

The inventors realised that in the known approach shown in FIG. 1 (PRIOR ART), traffic from the femto 3 which is destined for network elements behind the security gateway 1, such as the femto-gateway 5, do not include encryption or authentication information, since this is removed by the security gateway 1. In consequence, a compromised femto that initially authenticated with its correct identity to the security gateway can then subsequently connect to and register with the femto-gateway 5 using a different identity. The security gateway 1 does not detect this registration message as being invalid because the security gateway does not verify payload information. Faking a registration message in this way, enables a femto owner to compromise security, for example, by altering the femto configuration so that the femto becomes open access, hence enabling third party user terminals to make calls through the femtocell. This allows the owner to then eavesdrop on those calls made through the femto, including the calls of celebrities, so compromising privacy.

Figure 2:
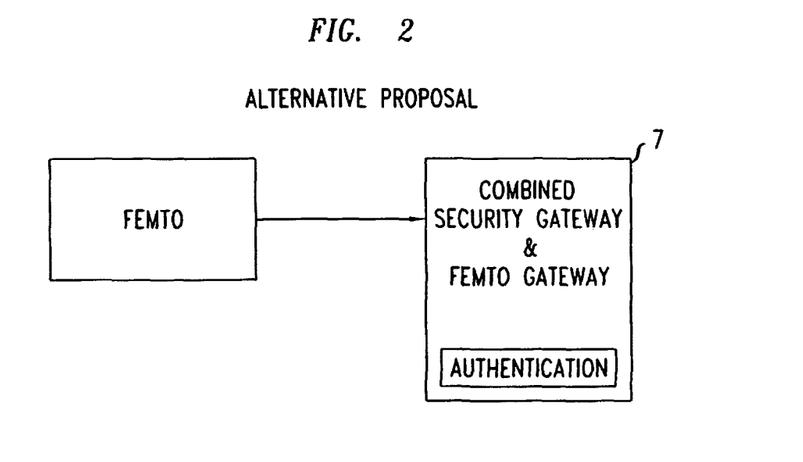
FIG. 2 is a diagram illustrating an alternative approach to femto authentication/authorisation (ALTERNATIVE PROPOSAL)

The inventor realised that an alternative proposal (not prior art nor an embodiment of the present invention) is to have the security gateway and femto-gateway combined as a single device. This is as shown in FIG. 2 (ALTERNATIVE PROPOSAL), and is a solution permitted by current 3GPP Universal Mobile Telecommunications System (UMTS) standard Release 9. This enables the femto-gateway function in the device to make use of the security gateway authentication function on the device to verify the source of a registration message. The inventors realised however that such combination is not always practical. For example, femto-gateways are typically provided to network operators by femto manufacturers whilst security gateways are usually purchased from a limited set of vendors who are not experts in femto technology.

Accordingly, the inventors realised that separation of the gateways is preferable, so to address the security concern, after successful authentication by the security gateway, an Internet Protocol source address is sent on from the security gateway to the femto-gateway where it is checked against that initially assigned by the femto-gateway to the femto.

We now describe a network including femtocell base stations then look in greater detail at femto authorisation processes.

Network

Figure 3:
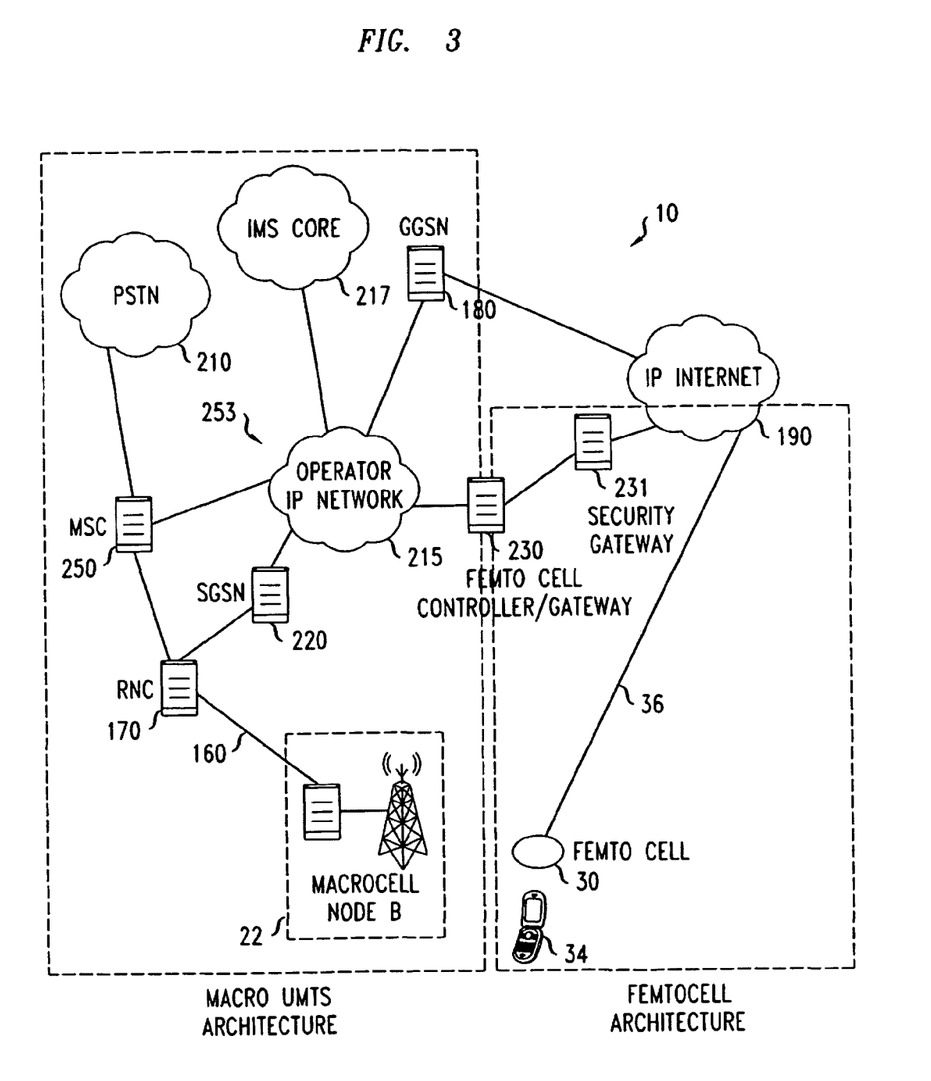
FIG. 3 is a diagram illustrating a wireless communications network according to a first embodiment of the present invention.
Figure 4:
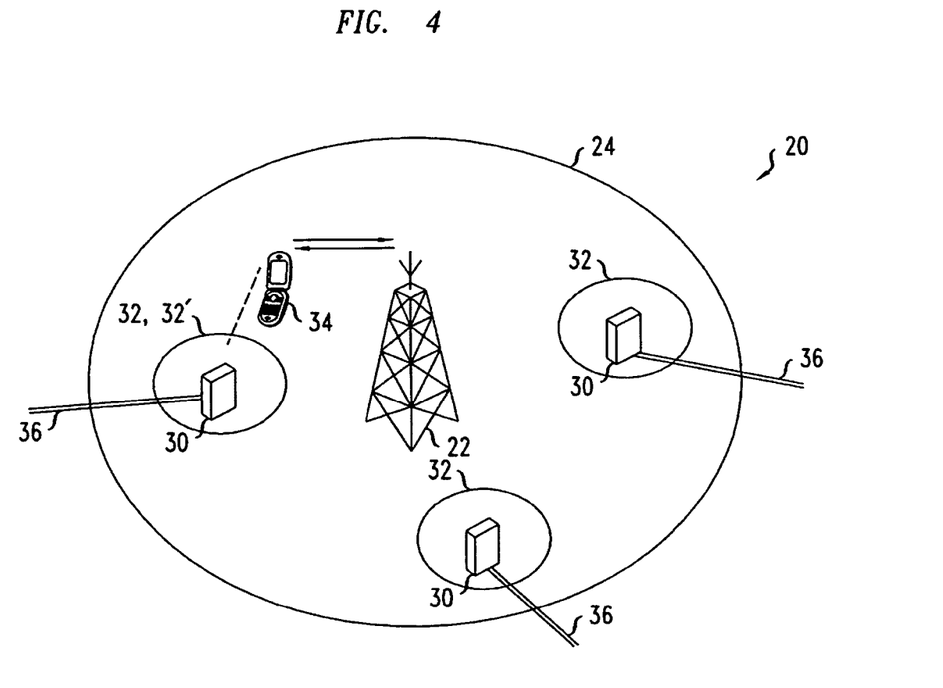
FIG. 4 is a diagram illustrating an example femtocell base station deployment within one macrocell shown in FIG. 1.

As shown in FIGS. 1 and 2, a network 10 for wireless communications, through which a user terminal 34 may roam, includes two types of base station, namely macrocell base stations and femtocell base stations (the latter being sometimes called "femtos"). One macrocell base station 22 is shown in FIGS. 3 and 4 for simplicity. Each macrocell base station has a radio coverage area 24 that is often referred to as a macrocell. The geographic extent of the macrocell 24 depends on the capabilities of the macrocell base station 22 and the surrounding geography.

Within the macrocell 24, each femtocell base station 30 provides wireless communications within a corresponding femtocell 32. A femtocell is a radio coverage area. The radio coverage area of the femtocell 32 is much less than that of the macrocell 24. For example, the femtocell 32 corresponds in size to a user's office or home.

As shown in FIG. 3, the network 10 is managed by a radio network controller, RNC, 170. The radio network controller, RNC, 170 controls the operation, for example by communicating with macrocell base stations 22 via a backhaul communications link 160. The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. For circuit-switched traffic, a mobile switching centre 250 is provided with which the radio network controller 170 may communicate. The mobile switching centre 250 communicates with a circuit-switched network such as a public switched telephone network (PSTN) 210. For packet-switched traffic, the network controller 170 communicates with serving general packet radio service support nodes (SGSNs) 220 and a gateway general packet radio service support node (GGSN) 180. The GGSN then communicates with a packet-switch core 190 such as, for example, the Internet 190.

The MSC 250, SGSN 220, GGSN 180 and operator IP network 215 constitute a so-called core network 253. The SGSN 220 and GGSN 180 are connected by the operator IP network 215 to a femtocell controller/gateway 230.

The femtocell controller/gateway 230 is connected via a security gateway 231 and the Internet 190 to the femtocell base stations 32. These connections to the security gateway 231 are broadband Internet Protocol connections ("backhaul") connections.

The operator IP network 215 is also connected to an Internet protocol Multimedia System (IMS) core network 217.

In FIG. 4, three femtocell base stations 30 and corresponding femtocells 32 are shown for simplicity.

It is possible for a mobile terminal 34 within the macrocell 24 to communicate with the macrocell base station 22 in known manner. When the mobile terminal 34 enters into a femtocell 32 for which the mobile terminal is registered for communications within the femtocell base station 30, it is desirable to handover the connection with the mobile terminal from the macrocell to the femtocell. In the example shown in FIG. 4, the user of mobile terminal 34 is a preferred user of the nearest 32' of the femtocells 32.

As shown in FIG. 4, the femtocell base stations 30 are connected via the broadband Internet Protocol connections ("backhaul") 36 to the core network (not shown in FIG. 4) and hence the rest of the telecommunications "world" (not shown in FIG. 4). The "backhaul" connections 36 allow communications between the femtocell base stations 30 through the core network (not shown). The macrocell base station is also connected to the core network (not shown in FIG. 4).

As previously mentioned, the femtocell base station is of a relatively low transmit power and hence each femtocell is of a small coverage area compared to a macrocell. A typical coverage range is tens of metres. Femtocell base stations have auto-configuring and self-optimising capabilities so as to enable non-optimised deployment, namely plug-and-play deployment by owners, so as to automatically integrate themselves into an existing macrocell network.

As previously mentioned, in order to be integrated with a macrocell network, femtocell base stations need to exchange signalling messages with various network elements within the (second generation/2.5 generation(2.5G)/third generation) macrocell network. This signalling is compliant with the Third Generation Partnership Project (3GPP) Standard (Release 8), such that femtocells appear as one or more 3GPP compliant nodes. Specifically, to achieve this, femtocell base stations are grouped into clusters, each cluster being connected via a gateway, known as a femto-gateway, to the macrocell network. The femto-gateway terminates the signalling between core network elements in the macrocell network and the femtocell cluster, thereby enabling the whole cluster of femtocells to appear as a single virtual radio network controller (RNC), in line with 3GPP standards (Release 8)).

Security Gateway and Femto Gateway

Figure 5:
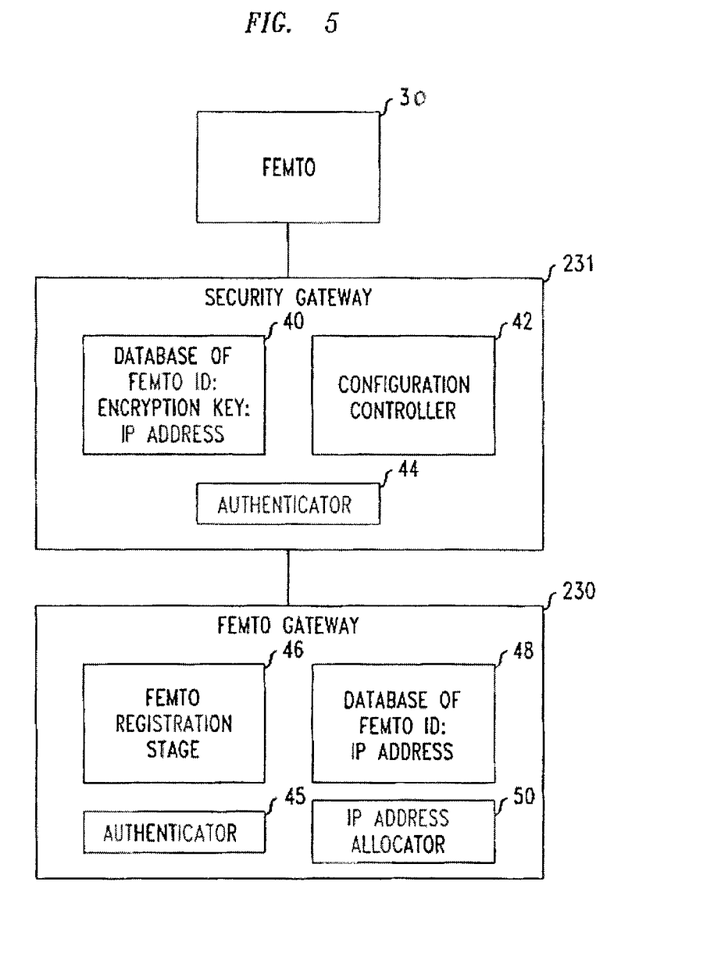
FIG. 5 is a diagram illustrating in more detail the femtocell base station, security gateway and femto-gateway shown in FIGS. 3 and 4.

As shown in FIG. 5, the femto 30 is connected to the security gateway 231 which is connected to the femto-gateway 230. The security gateway and femto-gateway are separate.

The security gateway 231 includes a database 40, a configuration controller 42, and an authenticator 44. The database 40 relates femtocell base station identifier (Femto ID) to source IP address and also to an encryption key.

The femto-gateway 230 includes an authenticator 45, a femto registration stage 46, a database 48 that relates Femto ID to source IP address of the femto, and an IP address allocator 50 that allocates an IP address to the femto for the femto to use as its own IP address.

In use the security gateway 231 requests a secondary authorisation by the femto-gateway 230 of all femtos which seek to set up IP tunnels to the femto-gateway.

Operation will be explained in more detail below.

Femto Authorisation Process

Figure 6:
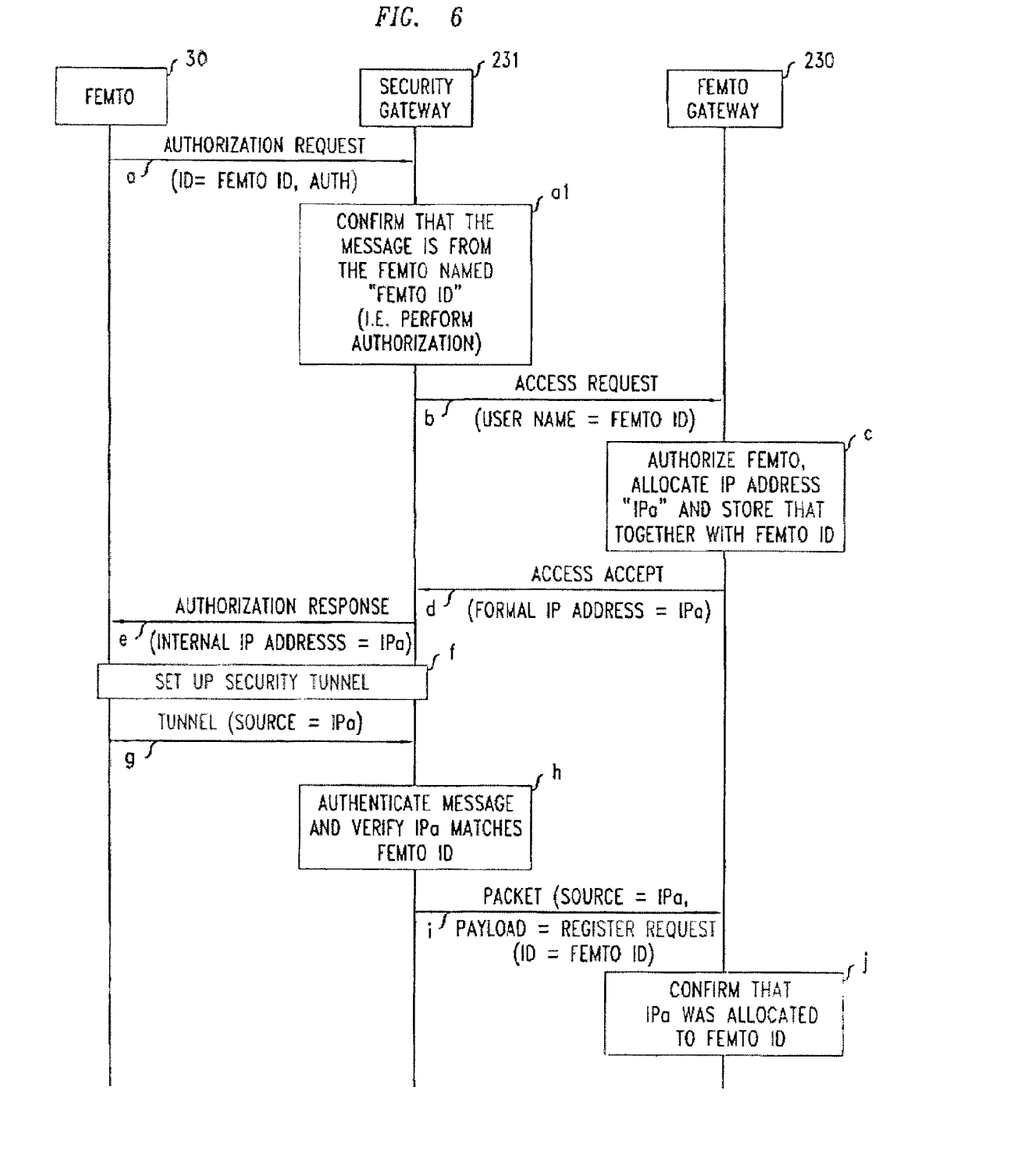
FIG. 6 is a message sequence diagram illustrating a femto authorisation scenario using the apparatus shown in FIG. 5.

As shown in FIG. 6, in this Universal Mobile Telecommunications System (UMTS)-based example, the femto 30 sends (step a) an authorisation request that includes the femto identifier (FemtoID) and authentication information. The security gateway performs a primary authorisation by checking (step a1) that the Femto ID is that of the femto from which the message was received. If so, the security gateway then sends (step c) a corresponding access request including the authorised Femto ID to the femto-gateway. The femto-gateway then (step c) also authorises the femto, and stores the FemtoID in the database 48 of the femto-gateway, and allocates an IP address for the femto. This IP address is stored in the database 48 mapped to the Femto ID.

The femto-gateway then returns (step d) an access accept message that includes this IP address to the security gateway. The configuration controller 42 of the security gateway then passes (step e) the IP address to the femto in an authorisation response message. A security tunnel is then set up (step f) between the femto 30 and security gateway.

The femto then sends (step g) a message, which includes the IP address, through the tunnel to the security gateway.

The security gateway uses an encryption key which the security gateway knows is allocated to that IP address in order to(step h) decrypt and authenticate the message and check that the IP address that the message contains accords with the FemtoID. This prevents the femto using a forged source IP address.

Assuming this authentication is successful, the security gateway sends (step i) the decrypted message, which contains the source IP address and a registration request, to the femto-gateway.

Upon receiving the message, the authenticator 45 of the femto-gateway 230 checks the source IP address and the FemtoID indicated in the registration request portion of the message. If the source IP address received corresponds with the one stored in the database 48 of the femto-gateway as having been allocated to that FemtoID, the identity is then considered authentic and the femto registration stage 46 of the femto-gateway registers that femto.

In this embodiment, the association between femto identifier stored (step c) and femto identifier received (step i) is established such that subsequent messages from the femto are automatically considered authorised. In some other embodiments, such authorisation is instead performed on each subsequent message (on-the-fly).

Another Example

Figure 7:
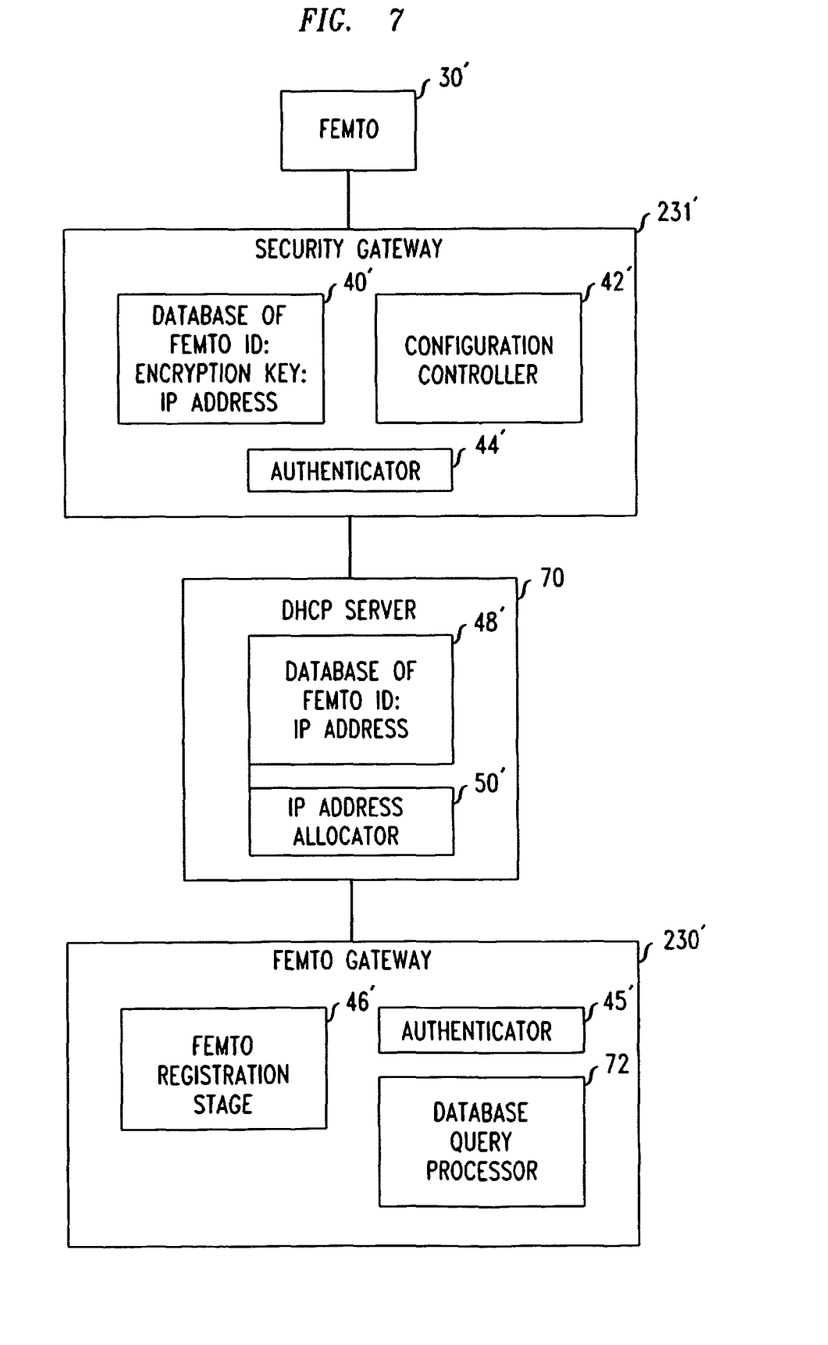
FIG. 7 is a diagram illustrating a femtocell base station, security gateway and femto-gateway, and Dynamic Host Configuration Protocol (DHCP) server according to a second embodiment of the invention.

As shown in FIG. 7, in a second example, the femto 30' is connected to the security gateway 231' which is connected to the femto-gateway 230'.

The security gateway 231' includes a database 40', a configuration controller 42', and an authenticator 44'. The database 40' relates femtocell base station identifier (Femto ID) to source IP address and also to an encryption key.

The femto-gateway 230' includes a femto registration stage 46', and a database query processor 72.

The security gateway 231' and femto-gateway 230' are interconnected directly and also via a Dynamic Host Configuration Protocol (DHCP) server 70 that includes a database 48' and an IP address allocator 50'. The database 48' relates Femto ID to source IP address of the femto. The IP address allocator 50' allocates an IP address to the femto for the femto to use as its own IP address.

In use, the security gateway requests a secondary authorisation by the femto-gateway of all femtos which seek to set up IP tunnels to the femto-gateway. The femto-gateway 230' queries the DHCP server 70 to effect this. Operation will be explained in more detail below.

Figure 8:
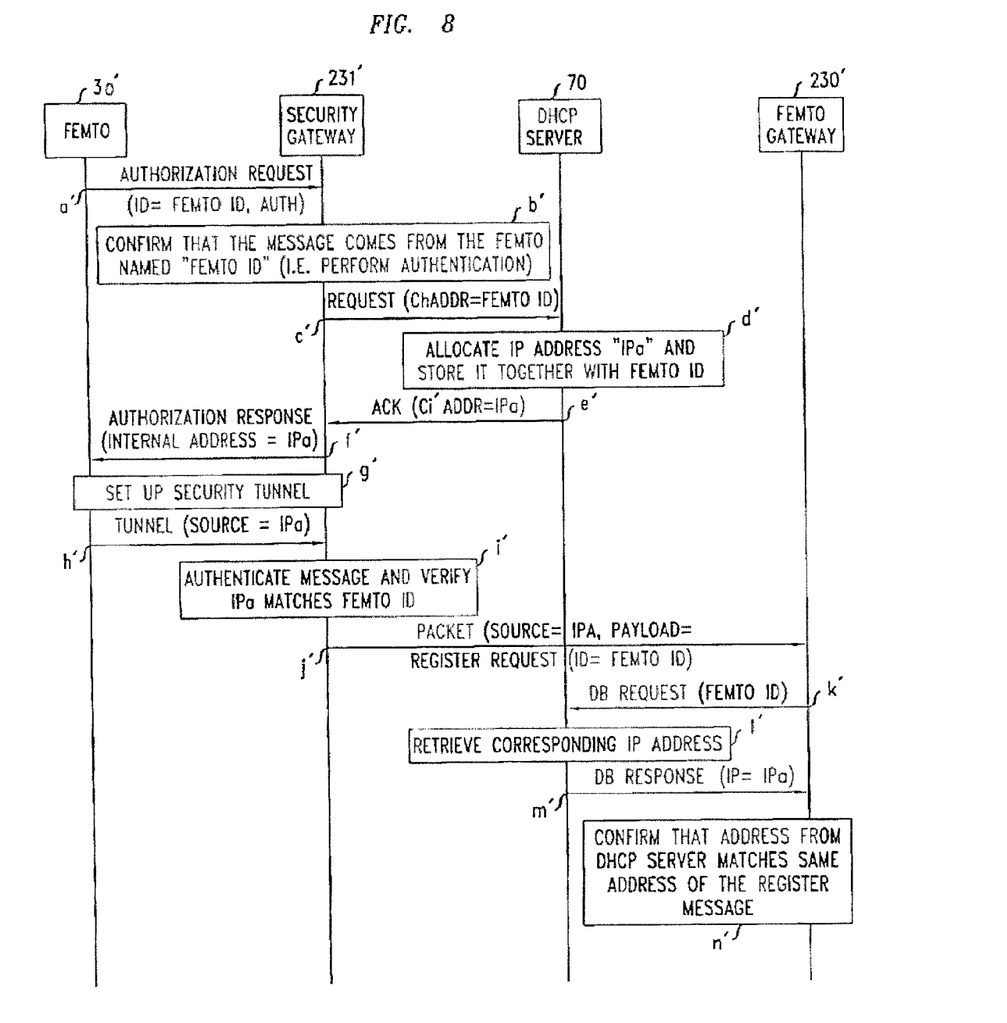
FIG. 8 is a message sequence diagram illustrating a femto authorisation scenario using the apparatus shown in FIG. 7.

As shown in FIG. 8, in this second example, which is also a Universal Mobile Telecommunications System (UMTS) based example, the security gateway is configured to retrieve the IP address from an independent server, namely the Dynamic Host Configuration Protocol (DHCP) server 70 in this example.

As shown in FIG. 8, the femto 30' sends (step a') an authorisation request that includes the femto identifier (FemtoID) and authentication information to the security gateway as a first step in establishing a security tunnel. The security gateway 231' receives this request and performs a primary authorisation by checking (step b') that the FemtoID is that of the femto from which the message was received. If so, the security gateway then sends (step c') a corresponding access request including the authorised FemtoID to the DHCP server 70 so as to request an IP address for the femto. This request includes the authenticated femto identity as a DHCP client hardware address (chaddr).

The DHCP server then (step d') stores the FemtoID in the database 48, and allocates an IP address for the femto. This IP address is stored in the database 48' mapped to the client hardware address which is the Femto ID.

The DHCP server then returns (step e') to the security gateway an access accept message that includes this IP address. The configuration controller 42' of the security gateway then passes (step f') the IP address to the femto 30' in an authorisation response message. A security tunnel is then set up (step g') between the femto 30' and security gateway 231'.

Following tunnel establishment, the femto then sends (step h') a message, which includes the IP address, through the tunnel to the security gateway.

The security gateway uses an encryption key which the security gateway knows is allocated to that IP address in order to (step i') decrypt and authenticate the message and check that the IP address that the message contains accords with the FemtoID. This prevents the femto being able to use a forged source IP address.

Assuming this authentication is successful, the security gateway sends (step j') the decrypted message, which contains the source IP address and a registration request that includes the FemtoID, to the femto-gateway.

Upon receiving the message, the database query processor 72 of the femto-gateway sends (step k') a request to the Dynamic Host Configuration Protocol (DHCP) server asking for the IP address which was allocated to this FemtoID identity. The DHCP server retrieves (step l') the corresponding IP address from its internal database 48' and responds (step m') to the femto-gateway with the allocated IP address. The authenticator 45' of femto-gateway 230' checks this IP address received from the DHCP server matches the source IP address of the packet containing the registration request portion of the message. If so, then the identity is considered authentic and the femto registration stage 46' of the femto-gateway registers that femto.

Some Variants

In the examples described in relation to FIGS. 5 to 8, the identifiers of the femto in the various messages are identical. However, they need not be. In some embodiments it is sufficient that there is a reliable mechanism, for example in the femto-gateway, to translate one identity format to another. For example, in the example described referring to FIGS. 5 and 6, the identity used in both messages to the femto-gateway, see steps denoted b and i above, for the femto is the same, namely Femto ID. In some other embodiments, they are different, but then the femto-gateway knows the mapping between the two different, but valid, identifiers of the femto so can check that they correlate. For example the two different identifiers could be in different formats, for example, Internet Key Exchange version 2 (IKEv2) and Home NodeB Application Part (HNBAP).

Also in a variant of the embodiment described with reference to FIGS. 7 and 8, the DHCP server has allocated multiple IP addresses to the same femto, for example, in establishing multiple IP tunnels. In this case it is sufficient that any one of the allocated addresses matches the source IP address of the packet that includes the registration request.

In some further embodiments, the use of the DHCP server allows several devices (servers, gateways, application devices etc) to authenticate registration messages from a femto. For example, if the femto also registers with a presence server, then the presence server can also request the associated IP address from the DHCP server using a similar exchange of messages.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of authenticating a message from a femtocell base station in a wireless telecommunications network comprising a security gateway and a femto-gateway, the method comprising:
    checking by the security gateway that a source IP address in the message from the femtocell base station accords with a femtocell base station identifier expected from that femtocell base station,
        wherein the security gateway uses an encryption key which the security gateway knows is allocated to that IP address in order to decrypt and authenticate the message and check that the IP address that the message contains accords with the femtocell base station identifier, and
    additionally checking by the femto-gateway that the source IP address in the message, the message including a femtocell base station identifier, accords with the source IP address expected from that femtocell base station as identified by that femtocell base station identifier by inspecting a database relating a femtocell base station identifier to source IP address data,
        wherein the security gateway requests secondary authorization by the femto-gateway of any femtocell base stations which seek to set up IP tunnels to the femto-gateway.

2. A method according to claim 1, in which the femtocell base station is connected to the femto-gateway via the security gateway.

3. A method according to claim 1, in which the source IP address is allocated by the femto-gateway for a connection over an IP tunnel with the femtocell base station and is recorded in the database as the source IP address data related to a femtocell base station identifier.

4. A method according to claim 1, in which the source IP address is allocated by a Dynamic Host Configuration Protocol (DHCP) server for a connection over an IP tunnel between the femto-gateway and the femtocell base station and is recorded in the database as the source IP address data related to a femtocell base station identifier.

5. A method according 1 to claim 3, in which the source IP address is allocated by allocating an IP address range for the connection over the IP tunnel with the femtocell base station and selecting a source IP address within that range for inclusion in the message, and the source IP address data recorded in the database comprising the source IP address range.

6. A method according to claim 1 in which the message is a registration request message, and upon both checks being passed, the femtocell base station is registered by the femto-gateway.

7. A wireless telecommunications network comprising a security gateway and a femto-gateway, and at least one femtocell base station,
the security gateway being configured to authenticate a message received from a femtocell base station, the security gateway comprising a checking processor configured to check that a source IP address in the message from the femtocell base station accords with a femtocell base station identifier expected from that femtocell base station, wherein the security gateway uses an encryption key which the security gateway knows is allocated to that IP address in order to decrypt and authenticate the message and check that the IP address that the message contains accords with the femtocell base station indentifier, and
the femto-gateway comprising a further processor configured to check that the source IP address in the message, the message including a femtocell base station identifier, accords with the source IP address expected from that femtocell base station as identified by that femtocell base station identifier by inspecting a database relating a femtocell base station identifier to source IP address data,
wherein the security gateway requests secondary authorization by the femto-gateway of any femtocell base station which seek to set up IP tunnels to the femto-gateway.

8. A network according to claim 7, in which said at least one femtocell base station is connected via the security gateway to the femto-gateway.

9. A network according to claim 7, in which the message is a registration request message and the femto-gateway being configured to register the femtocell base station upon the accordance being found.

10. A network according to claim 7, in which the femto-gateway comprises the database.

11. A network according to claim 7, in which the source IP address is allocated by the femto-gateway for a connection over an IP tunnel with the femtocell base station and is the source IP address data recorded in the database as related to the femtocell base station identifier for use in checking.

12. A network according to claim 7, in which the source IP address is allocated by a separate network element for a connection over an IP tunnel between the femto-gateway and the femtocell base station and is the source IP address data recorded in the database as related to a femtocell base station identifier.

13. A network according to claim 12, in which the separate network element comprises the database.

14. A network according to claim 12, in which the separate network element is a Dynamic Host Configuration Protocol server.

15. A network according to claim 7, in which, in use, the source IP address is allocated by allocating an IP address range for the connection over the IP tunnel with the femtocell base station, and the femtocell base station selecting a source IP address within that range for inclusion in the message, and the source IP address data recorded in the database is the source IP address range.

16. A security gateway in a telecommunications system, the security gateway being configured to authenticate a message received from a femtocell base station, the security gateway comprising:
a configuration controller;
a database which relates a femtocell base station identifier, in the message received from the femtocell base station, to a source IP address and also to an encryption key, wherein the security gateway uses an encryption key which the security gateway knows is allocated to that IP address in order to decrypt and authenticate the message and check that the IP address that the message contains accords with the femtocell base station identifier; and
an authenticator configured to check that the source IP address in the message from the femtocell base station accords with a femtocell base station identifier expected from that femtocell base station.

17. A femto-gateway in a telecommunications system, the femto-gateway comprising:
a femto registration stage;
an IP address allocator configured to allocate an IP address to a femtocell base station for the femtocell base station to use as its own IP address; and
an authenticator configured to check that the source IP address in a message from the femtocell base station, the message including a femtocell base station identifier, accords with the source IP address expected from that femtocell base station as identified by that femtocell base station identifier by inspecting a database,
wherein the femto-gateway receives a respective request from a security gateway for any femtocell base station which seek to set up IP tunnels to the femto-gateway.

18. The femto-gateway as set forth in claim 17, wherein the database relates a femtocell base station identifier to a source IP address of the femtocell base station.

* * * * *